US005556029A

United States Patent [19]
Griese

[11] Patent Number: 5,556,029
[45] Date of Patent: Sep. 17, 1996

[54] METHOD OF HYDROMETEOR DISSIPATION

[76] Inventor: Gary B. Griese, 558 Gladys Ave., Elmhurst, Ill. 60126

[21] Appl. No.: 304,743

[22] Filed: Sep. 12, 1994

[51] Int. Cl.⁶ .................................................. A01G 15/00
[52] U.S. Cl. ............................................ 239/2.1; 239/14.1
[58] Field of Search .................................... 239/14.1, 2.1

[56] References Cited

U.S. PATENT DOCUMENTS

| 3,272,435 | 9/1966 | Brownell, Jr. .......................... 239/14.1 |
| 3,606,153 | 9/1971 | Boucher .............................. 239/14.1 X |
| 3,666,176 | 5/1972 | Carter, Jr. ................................ 239/2.1 |
| 3,712,542 | 1/1973 | Price, Jr. ................................. 239/2.1 |
| 3,940,060 | 2/1976 | Viets ...................................... 239/14.1 |

FOREIGN PATENT DOCUMENTS

| 2366789 | 6/1978 | France . |
| 2216996 | 4/1972 | Germany . |
| 2311169 | 3/1973 | Germany . |
| 2204512 | 8/1990 | Japan . |
| 2204513 | 8/1990 | Japan . |
| 376913 | 4/1991 | Japan . |
| 9010378 | 9/1990 | WIPO ..................................... 239/2.1 |
| 9214882 | 9/1992 | WIPO . |

OTHER PUBLICATIONS

"Hurricane Reaping the Whirlwind" Omni Mar. 1994, pp. 35–47.

Primary Examiner—Andres Kashnikow
Assistant Examiner—Lesley D. Morris
Attorney, Agent, or Firm—Jenner & Block

[57] ABSTRACT

A method of dissipating hydrometeors (clouds) that includes transmitting electromagnetic radiation (e.g., light energy, from the sun, for example) that is absorbed by water vapor into the cloud to be dissipated and continuing the transmission of such energy into the cloud until it dissipates. The source of electromagnetic radiation can be a large mirror located on the surface of the earth, that reflects sunlight into the cloud to be dissipated. In a still more specific embodiment of the invention, the wind speed, direction, cloud altitude and sun movement relative to the earth is tracked to determine the mirror orientation and tracking necessary to disperse a particular cloud or clouds. In addition, an array of earth-mounted mirrors could be utilized in a coordinated fashion to dissipate a group or larger volume of clouds.

9 Claims, 3 Drawing Sheets

METHOD OF HYDROMETEOR DISSIPATION

FIELD OF THE INVENTION

This invention relates to a method for dissipating hydrometeors and more particularly to a method of hydrometeor dissipation utilizing sunlight.

BACKGROUND OF THE INVENTION

Hydrometeors, as used herein, means atmospheric water clouds, composed of large numbers of water droplets or ice crystals that are virtually suspended in the atmosphere. As used herein throughout this disclosure, the term "cloud" means an atmospheric water cloud or hydrometeor. The water or ice in a hydrometeor occupies only a small fraction of the total space appearing as the hydrometeor.

It would be desirable to have a method of dissipating or eliminating clouds or hydrometeors. For example, it is desirable in some cases to eliminate clouds to maximize the amount of direct sunlight impinging on a particular area or region of the earth. Alternatively, on a small scale, it is desirable to reduce the size of a cloud or to dissipate it completely, for purposes of amusement or scientific curiosity. Thus, there is a need for dissipating hydrometeors.

SUMMARY OF THE INVENTION

In accordance with the present invention, a method of dissipating a hydrometeor is provided. The method includes directing, from the surface of the earth, electromagnetic radiation, of a type that is absorbed by water, into the hydrometeor to be dispersed for a sufficient duration of time and in an amount sufficient to impart energy to the water of the hydrometeor to dissipate at least a portion of the hydrometeor. In one embodiment, the electromagnetic radiation is reflected sunlight. Sunlight can be reflected utilizing a plane or slightly concave mirror. Preferably, a concave mirror for use in accordance with the invention will have an extremely long focal length, on the order of from about ½ to about 1½ miles or more. A plurality of mirrors in an array could be utilized. The mirrors in the array could be planar or one or more of which could be slightly concave or have different degrees of concavity (e.g. different focal lengths).

In accordance with another embodiment of the invention, the method includes the step of determining whether the cloud is moving relative to the earth and, if the cloud is moving, the additional steps of tracking the movement of the cloud and adjusting the direction of electromagnetic radiation to follow the movement of the cloud. In order to track the cloud, the speed, direction and altitude of the cloud is determined. When reflected sunlight is utilized, the movement of the sun relative to the mirror can also be tracked to provide data for adjusting the mirror to maintain reflected sunlight on the cloud.

In accordance with still another aspect of the present invention, a method of dissipating a moving hydrometeor is provided. This method includes the steps of tracking the movement of the cloud by determining the altitude, speed and direction of movement of the cloud, directing reflected sunlight into the cloud and adjusting the direction of reflected sunlight to follow the movement of the cloud and continuing the directing of the reflected sunlight into the cloud for a sufficient time and in sufficient amounts to cause dissipation of at least a portion of the cloud. By continuing the step of directing reflected sunlight into the cloud, the cloud can be entirely dissipated.

DETAILED DESCRIPTION OF THE INVENTION

Figure 1:
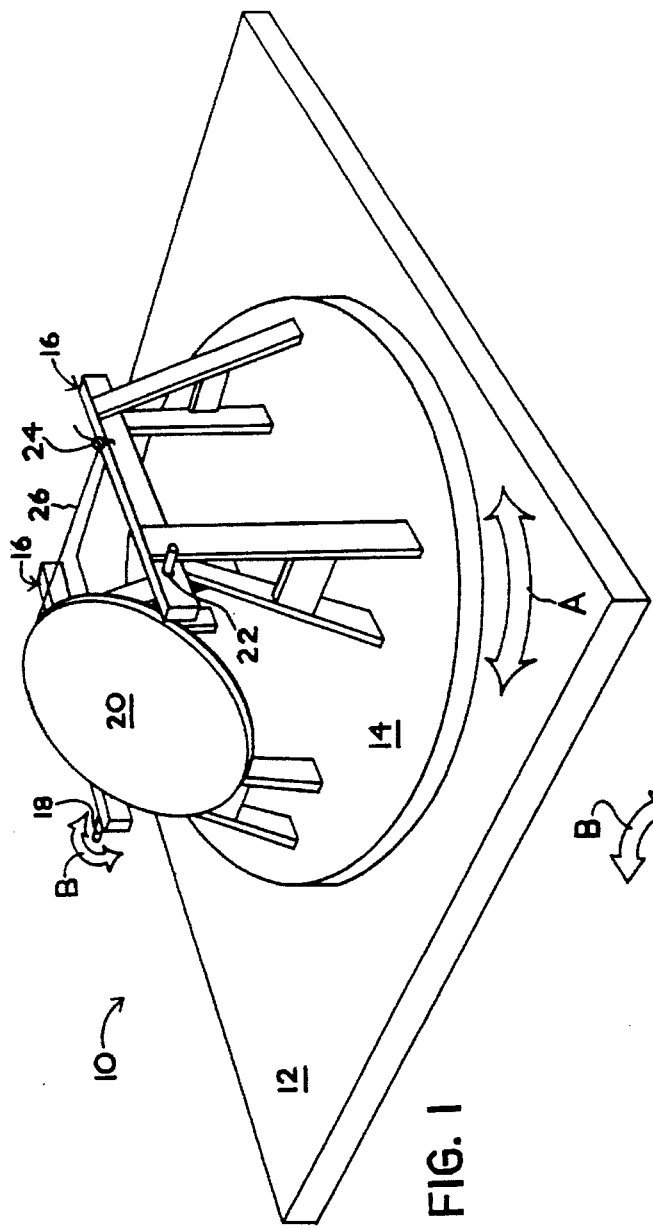
FIG. 1 is a perspective view of one embodiment of a device useful in practicing the method of the present invention.
Figure 2:
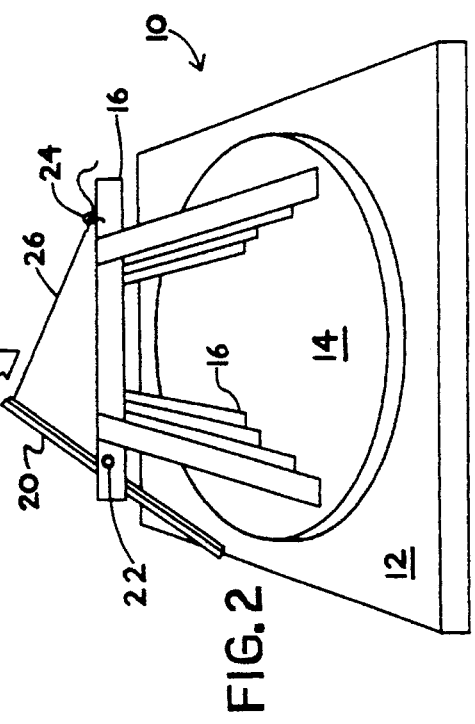
FIG. 2 is a side elevation view of the device illustrated in FIG. 1.

Referring to the drawings generally, where like reference numerals indicate like structure, and in particular FIGS. 1 and 2, there is illustrated a reflecting device 10 useful in practicing the method of the present invention. Reflecting device 10 includes a base 12, a turntable 14, mirror support structure 16, mirror spindle 18 and mirror 20.

Base 12 of reflecting device 10 forms a stable, stationary, level base for turntable 14. Turntable 14 is mounted to base 12 for rotation with respect thereto by any suitable structure (not shown) well known in the art. Turntable 14 can be rotated 360° and in either direction, as indicated by arrow A. A pair of mirror support structures 16 rest on turntable 14 for supporting mirror spindle 18 which, in turn, has mirror 20 mounted thereto. Mirror support structure 16 can be of any suitable design as long as it is sufficient for supporting mirror spindle 18 and mirror 20. In the illustrated embodiment, mirror support structure 16 is in the form of a sawhorse.

Mirror spindle 18 is mounted to and carried by bearings 22 of mirror support structure 16, thereby allowing mirror spindle 18 to be rotated with respect thereto as illustrated by arrow B to provide a desired angle of inclination for mirror 20 which is rigidly mounted to spindle 18. When mirror 20 is adjusted to a desired direction and angle of inclination by means of turntable 14 and spindle 18, mirror 20 can be fixed in that angle of inclination to a tie 24 located on mirror support structure 16 by means of a rope 26 or other suitable structure. Mirror 20 is mounted to spindle 18 so that the center of gravity of mirror 20, when vertically oriented, is below spindle 18 so that a moment is created to keep rope 26 taut.

Figure 5:
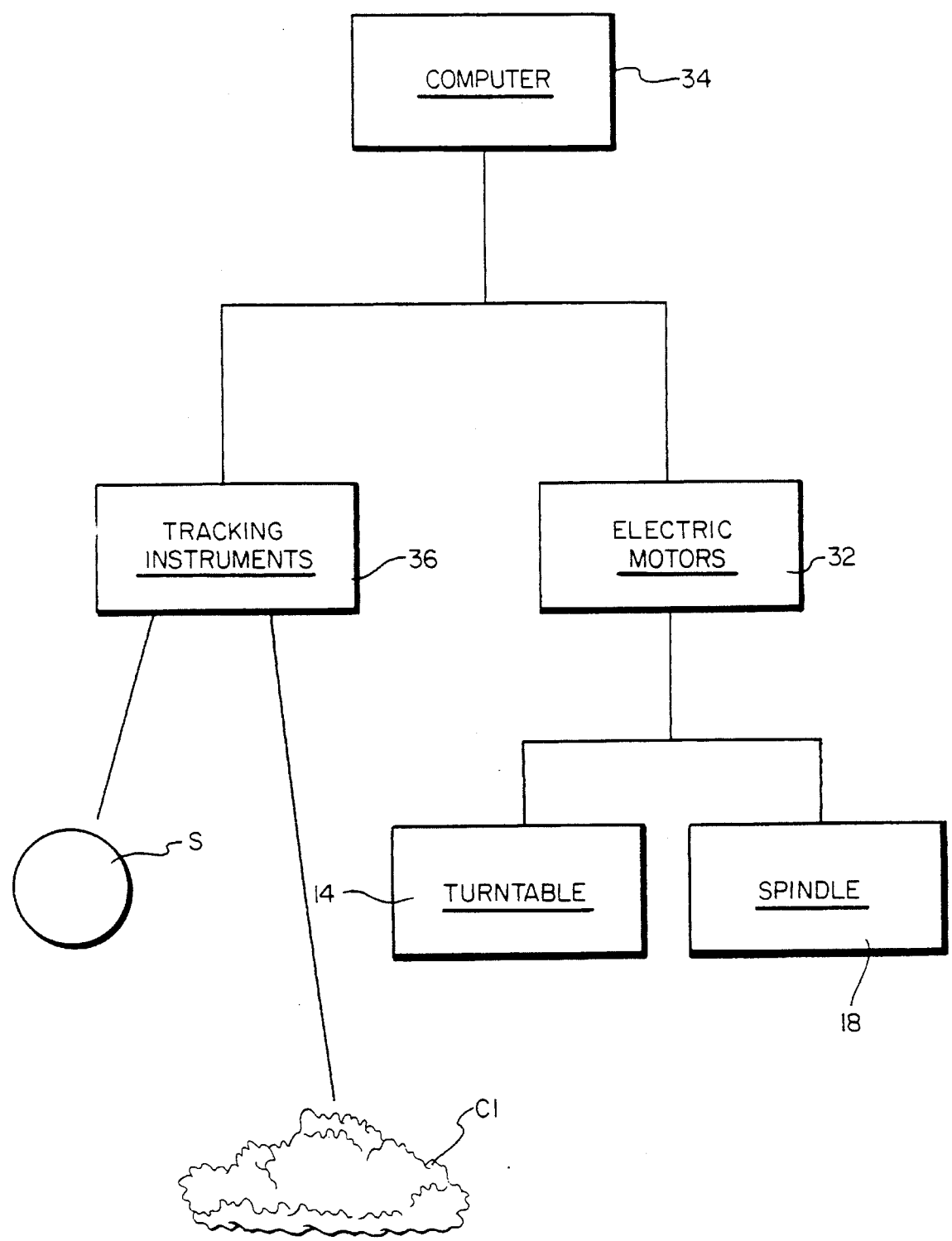
FIG. 5 is a block diagram of another embodiment of a device useful in practicing the method of the present invention.

Alternatively, as illustrated in FIG. 5 turntable 14 and spindle 18 could be adjusted and controlled by electric drive motors 32 which, in turn, could be controlled by a computer 34 in a manner well known to those skilled in the art, using a suitable mechanical drive mechanism, such as a gear drive for turntable 14 and spindle 18.

Mirror 20 preferably is constructed of high quality mirror glass having a low content of iron and preferably having a thickness of about 3 millimeters or less. In addition, mirror 20 preferably should have a reflectance of at least about 85%, and more preferably at least about 90%. High quality silver mirrors are especially suitable. While in the illustrated embodiment mirror 20 is flat and circular, it is to be understood that mirror 20 could be of any desired shape, such as a square or rectangle. Preferably, mirror 20 should be large in size, usually at least twenty inches or greater, since the amount of energy transmitted to the cloud by mirror 20 is dependent on the area of mirror 20. In addition, mirror 20 can be slightly concave, with a very long focal length, on the order of about ½ mile or more, for example.

Figure 4:
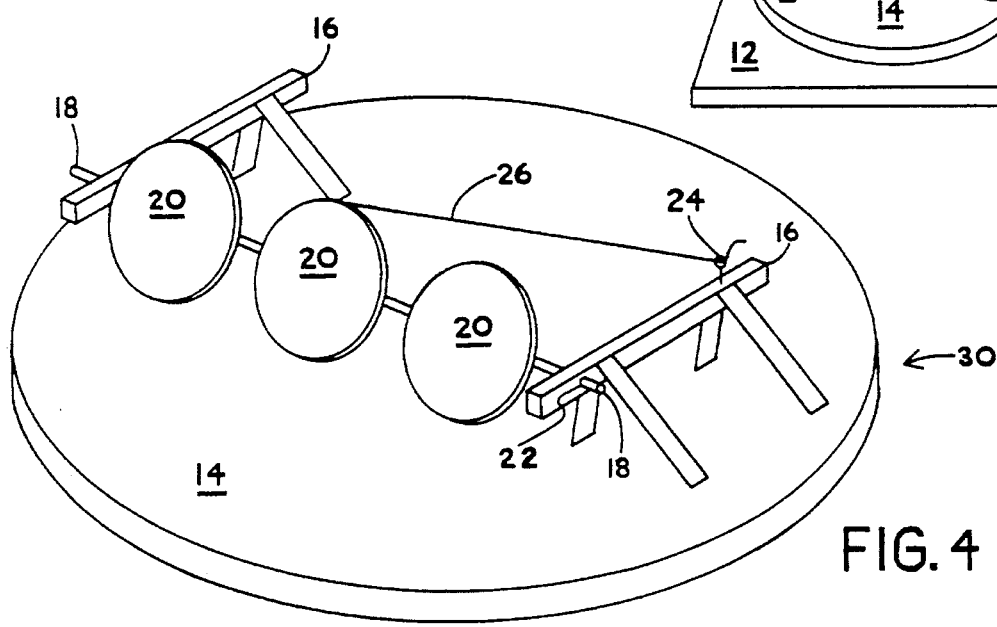
FIG. 4 is a perspective view of another embodiment of a device useful in practicing the method of the present invention.

FIG. 4 illustrates a reflecting device 30 which is another embodiment of reflecting device 10 previously described. Reflecting device 30 is composed of a turntable 14' mounted to a base (not shown), a mirror support structure 16', a plurality of mirrors 20', a mirror spindle 18', bearings 22', a tie 24' and a rope 26', each of which are similar to the components of reflecting device 10 previously described. Reflecting device 30 includes mirrors 20' to provide additional reflected light energy.

Figure 3:
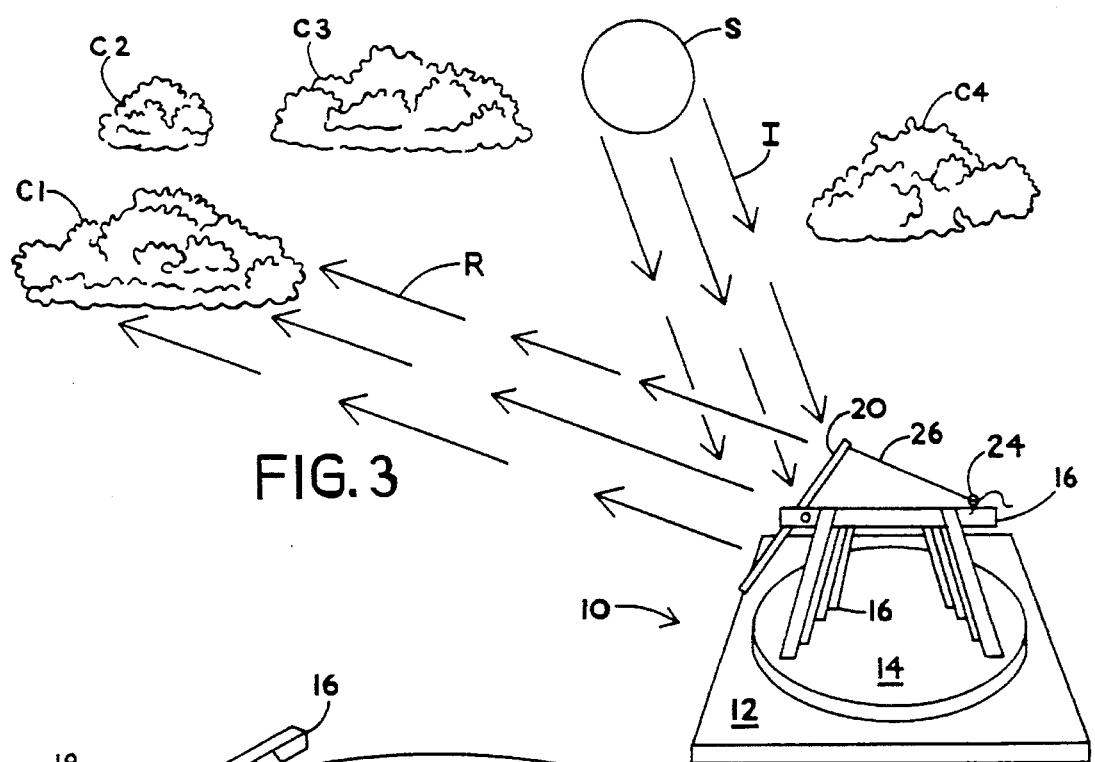
FIG. 3 is a schematic view illustrating use of the device of FIG. 1.

Referring to FIG. 3, there is illustrated a schematic view of reflecting device 10 in accordance with the invention. Reflecting device 10 is positioned on the surface of the earth. A plurality of clouds, C1, C2, C3 and C4 are illustrated in various positions in the sky together with the sun S. Mirror 20 has been rotated in the general direction of cloud C1 by rotation of turntable 14, taking into account the position and angle formed between cloud C1, mirror 20 and sun S. Thereafter, mirror 20 has been adjusted so that the angle of inclination causes sunlight from sun S impinging on mirror 20 to be reflected into cloud C1. The correct angle of inclination and position of turntable 14 can be easily determined since the incident rays of sunlight I equal the angle of incidence of the reflected rays of sunlight R.

Referring to FIGS. 3 and 5, in accordance with another aspect of the method of the present invention, the altitude, direction and speed of cloud C1 is tracked by use of suitable instruments 36 that provide electronic input to a computer 34 which are well known to those skilled in the art. In addition, the movement of the sun relative to the mirror (or earth if the mirror is stationary relative to the earth) could also be taken into account to provide input data for adjustment of turntable 14 and mirror 20 so that reflected sunlight R continues to strike cloud C1 in a desired location, thereby providing energy for dissipation of cloud C1. A microprocessor or computer could be readily programmed by one skilled in the art to manipulate the cloud and sun travel data to control a mechanical drive for positioning mirror 20 as desired to maintain direct reflected sunlight in the desired direction. In this manner, reflected sunlight is continuously divided into a desired cloud or portion thereof until dissipation occurs.

While the invention has been described with respect to certain preferred embodiments, it is to be understood that the invention is capable of numerous changes, rearrangements and modifications as fall within the spirit and scope of the appended claims. For example, numerous mirror rays could be utilized and spaced apart over the surface of the earth to achieve dissipation of a desired volume of clouds. Such a large array of mirrors could be computer controlled to direct sunlight in a desired location or locations.

What is claimed is:

1. A method of dissipating a hydrometeor comprising:

directing from the surface of the earth reflected sunlight that is absorbed by water into the hydrometeor to be dispersed for a sufficient duration of time and in an amount to impart sufficient energy to the water of the hydrometeor to dissipate at least a portion of the hydrometeor.

2. The method of claim 1 wherein the directing of sunlight is performed by reflecting incident sunlight on the surface of the earth with a mirror.

3. The method of claim 2 wherein said mirror has a degree of reflectance greater than 85%.

4. A method of dissipating a hydrometeor comprising:

directing from the surface of the earth electromagnetic radiation that is absorbed by water into the hydrometeor to be dispersed for a sufficient duration of time and in an amount to impart sufficient energy to the water of the hydrometeor to dissipate at least a portion of the hydrometeor;

determining whether the hydrometeor is moving relative to the earth and, if the hydrometeor is moving, tracking the movement of the hydrometeor and adjusting the direction of electromagnetic radiation to follow the movement of the hydrometeor.

5. The method of claim 4 wherein said tracking includes determining the speed, direction and altitude of the hydrometeor.

6. The method of claim 5 wherein said electromagnetic radiation is sunlight reflected by a mirror and said directing step further comprises tracking the movement of the sun relative to the mirror over time and adjusting the mirror position to maintain directing reflected sunlight into the hydrometeor.

7. A method of dissipating a moving hydrometeor comprising:

tracking the movement of the hydrometeor by determining the altitude, speed and direction of movement of the hydrometeor;

directing reflected sunlight into the hydrometeor;

adjusting the direction of reflected sunlight to follow the movement of the hydrometeor; and continuing the directing of the reflected sunlight into the hydrometeor for a sufficient time and in sufficient amounts to cause dissipation of at least a portion of the hydrometeor.

8. The method of claim 7 wherein said reflected sunlight is directed into the hydrometeor until the entire hydrometeor is dissipated.

9. The method of claim 7 further comprising tracking the movement of the sun relative to the mirror and adjusting the mirror position to maintain the directing of reflected sunlight into the hydrometeor.

* * * * *